US012572100B2

(12) United States Patent
Kikuchi et al.

(10) Patent No.: US 12,572,100 B2
(45) Date of Patent: Mar. 10, 2026

(54) IMAGE FORMING APPARATUS

(71) Applicant: CANON KABUSHIKI KAISHA,
Tokyo (JP)

(72) Inventors: Kyohei Kikuchi, Ibaraki (JP); Masami Hano, Chiba (JP); Yoshiro Tsukada, Chiba (JP); Toshiyuki Yamada, Tokyo (JP); Kota Kurokawa, Chiba (JP); Daisuke Katayama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/743,350

(22) Filed: Jun. 14, 2024

(65) Prior Publication Data

US 2024/0419109 A1     Dec. 19, 2024

(30) Foreign Application Priority Data

Jun. 15, 2023     (JP) ................................ 2023-098587

(51) Int. Cl.
G03G 15/00          (2006.01)
G03G 15/01          (2006.01)
          (Continued)

(52) U.S. Cl.
CPC ..... G03G 15/5029 (2013.01); G03G 15/0189 (2013.01); G03G 15/5016 (2013.01);
          (Continued)

(58) Field of Classification Search
CPC ........... G03G 15/5025; G03G 15/5029; H04N 1/00724; H04N 1/00726; G06K 15/186
See application file for complete search history.

(56) References Cited

U.S. PATENT DOCUMENTS

2009/0286177 A1* 11/2009 Tyagi ................... G03G 9/0821
                                                        430/124.1
2013/0279958 A1* 10/2013 Yukie ................. G03G 15/6585
                                                        399/341
(Continued)

FOREIGN PATENT DOCUMENTS

JP          9-331450 A      12/1997
JP       2020-034649 A       3/2020
(Continued)

OTHER PUBLICATIONS

U.S. Appl. No. 18/743,365, Daisuke Katayama Masami Hano Yoshiro Tsukada Toshiyuki Yamada Kyohei Kikuchi Kota Kurokawa, filed Jun. 14, 2024.

*Primary Examiner* — Carla J Therrien
(74) *Attorney, Agent, or Firm* — Venable LLP

(57) ABSTRACT

An image forming apparatus capable of forming an image on a perforated sheet includes an image forming portion for forming a toner image with toner of a plurality of colors, an image processing portion for performing image processing on image data acquired, and a controller for controlling the image processing portion to form the toner image on the basis of the image data processed by the image processing portion. In a case that a sheet on which the toner image is to be formed is the perforated sheet, the image processing portion performs the image processing so that black image data is formed as image data of process black with the toner of the plurality of colors by the image forming portion.

8 Claims, 14 Drawing Sheets

(51) Int. Cl.
    *G06K 15/02*       (2006.01)
    *H04N 1/00*       (2006.01)
    *H04N 1/028*      (2006.01)

(52) U.S. Cl.
    CPC ....... *G06K 15/186* (2013.01); *H04N 1/00702*
        (2013.01); *H04N 1/00724* (2013.01); *H04N*
        *1/00737* (2013.01); *H04N 1/00795* (2013.01);
        *H04N 1/02815* (2013.01); *H04N 1/00726*
        (2013.01); *H04N 2201/0081* (2013.01)

(56) References Cited

U.S. PATENT DOCUMENTS

| | | | | |
|---|---|---|---|---|
| 2017/0209781 A1* | 7/2017 | Gaynor | .................. | G03G 15/00 |
| 2021/0322863 A1* | 10/2021 | Irwin, Jr. | ................ | A63F 3/065 |
| 2022/0129713 A1 | 4/2022 | Suzuki | | |
| 2022/0129715 A1* | 4/2022 | Kuo | .................. | G03G 15/5062 |
| 2024/0012354 A1* | 1/2024 | Kikuchi | ................ | G03G 21/00 |
| 2024/0419109 A1* | 12/2024 | Kikuchi | ............. | H04N 1/00724 |

FOREIGN PATENT DOCUMENTS

| | | |
|---|---|---|
| JP | 2022-030246 A | 2/2022 |
| JP | 2022-071751 A | 5/2022 |

\* cited by examiner

IMAGE FORMING APPARATUS

FIELD OF THE INVENTION AND RELATED ART

The present invention relates to an image forming apparatus, such as a printer, a copying machine, a facsimile machine, or a multi-function machine, of an electrophotographic type.

An image forming apparatus includes a cassette and a manual feeding tray on which sheets are settable, and forms images on various sheets fed from these cassette and manual feeding tray by transferring toner images onto the sheets. There is a case that as the sheet, a sheet subjected to perforation processing (hereinafter, referred to as a perforated sheet) is used in some cases (Japanese Laid-Open Patent Publication (JP-A) No. 2022-71751). Further, conventionally, in order to generate image data for output at a lower gradation than a gradation of inputted image data, an image forming apparatus capable of selectively executing, as half-tone processing, screen processing and error diffusion processing has been proposed (JP-A No. Hei 9-331450).

However, conventionally, there as a liability that an image defect occurs when the toner image is formed on the perforated sheet.

SUMMARY OF THE INVENTION

According to an aspect of the present invention, there is provided an image forming apparatus capable of forming an image on a perforated sheet, comprising: an image forming portion configured to form a toner image with toner of a plurality of colors; an image processing portion configured to perform image processing on image data acquired; and a controller configured to control the image processing portion to form the toner image on the basis of the image data processed by the image processing portion, wherein in a case that a sheet on which the toner image is to be formed is the perforated sheet, the image processing portion performs the image processing so that black image data is formed as image data of process black with the toner of the plurality of colors by the image forming portion.

Further features of the present invention will become apparent from the following description of exemplary embodiments with reference to the attached drawings.

DESCRIPTION OF THE EMBODIMENTS

First Embodiment

<Image Forming Apparatus>

Figure 1:
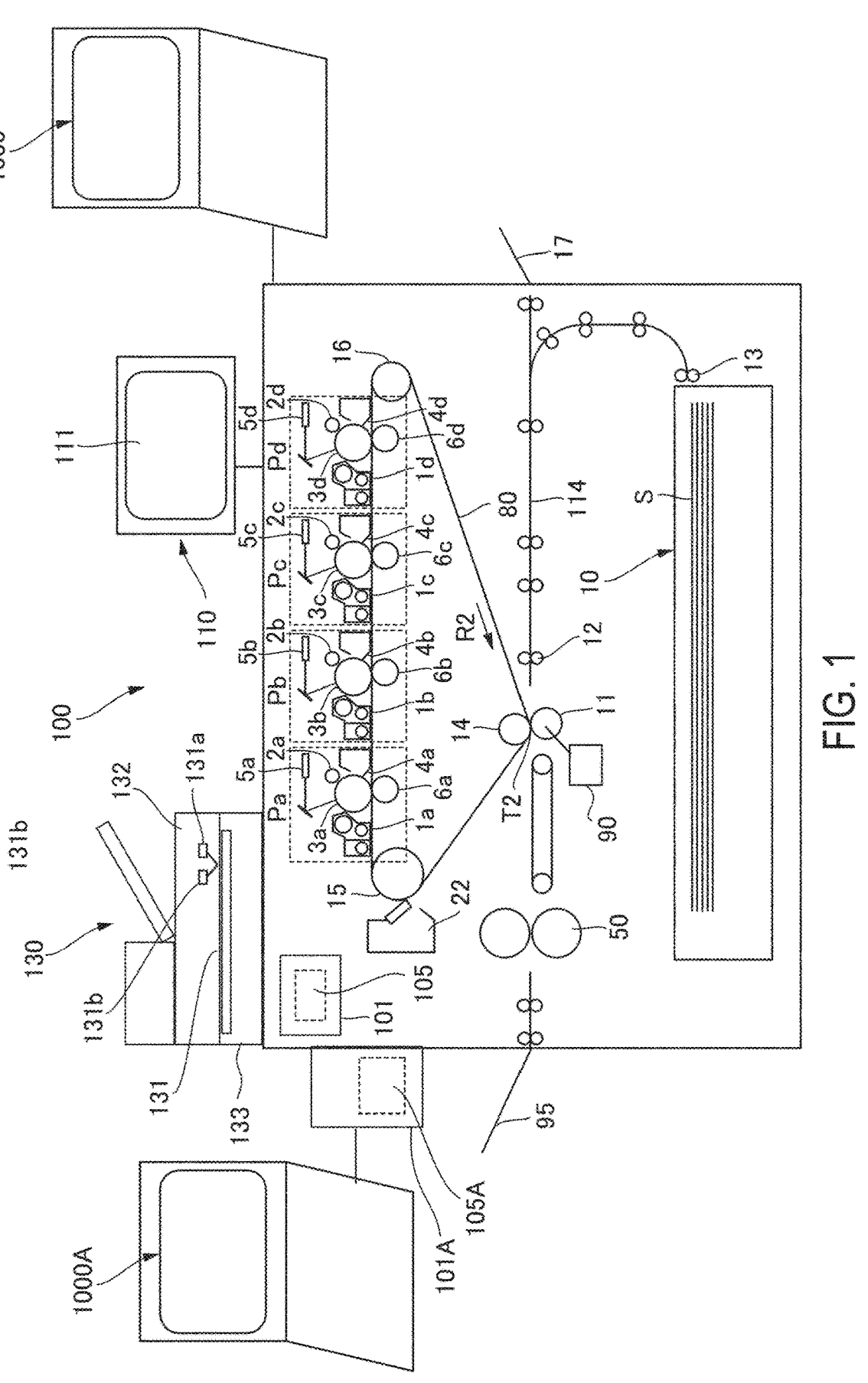
FIG. 1 is a schematic view showing an image forming apparatus of an embodiment.

An image forming apparatus of the present invention will be described using FIG. 1. An image forming apparatus 100 is an electrophotographic full-color printer of a tandem type. The image forming apparatus 100 includes image forming portions Pa, Pb, Pc, and Pd for forming images of yellow, magenta, cyan, and black, respectively. The image forming portion Pd corresponds to a first image forming portion for forming a toner image of black (first color), the image forming portion Pa corresponds to a second image forming portion for forming a toner image of yellow (second color), the image forming portion Pc corresponds to a third image forming portion for forming a toner image of magenta (third color), and the image forming portion Pd corresponds to a fourth image forming portion for forming a toner image of cyan (fourth color). The image forming apparatus 100 forms the toner image on a sheet S on the basis of image data sent from an original reading device 130 connected to, for example, the image forming apparatus 100 or from an external device 1000 such as a personal computer connected to the image forming apparatus 100. As the sheet S, it is possible to cite sheet materials, such as plain paper, thick paper, roughened paper, uneven paper and coated paper.

The original reading device 130 as an original reading portion is provided at an upper portion of the image forming apparatus 100, and includes an image reading portion 131 for reading an image on the sheet S on which the image has already been formed in advance and an original conveying portion 132 for automatically conveying the sheet S to the image reading portion 131. The image reading portion 131 irradiates the sheet S, conveyed onto a plating glass 133, with light by an irradiation portion 131a and receives, by a light receiving portion, the irradiated light reflected from the sheet S, so that the image reading portion 131 is capable of reading the image on the sheet S with a dot density determined in advance.

A conveying process of the sheet S in the image forming apparatus 100 will be described. The sheet S is capable of being set in a cassette 10 in a stacked form. Or, the sheet S is capable of being set on a manual feeding tray 17 in the stacked form. The sheet S set in the cassette 10 or on the manual feeding tray 17 is sent in accordance with an image forming timing by a supplying roller 13. The cassette 10 or the manual feeding tray 17 is provided so as to be openable and closable, and a user may be capable of arbitrarily opening and closing the cassette 10 or the manual feeding tray 17.

The sheet S fed by the supplying roller 13 is conveyed toward a registration roller pair 12 provided along a conveying portion 114. Then, the sheet S is subjected to oblique movement correction or timing correction in the registration roller pair 12, and thereafter, is sent to a secondary transfer nip T2. The secondary transfer nip T2 is a transfer nip portion formed by an inner secondary transfer roller 14 and an outer secondary transfer roller 11, and the toner image is transferred onto the sheet S in response to application of a secondary transfer voltage to the outer secondary transfer roller 11 as a transfer portion by a power source 90. Incidentally, only one cassette 10 is shown in FIG. 1, but a plurality of cassettes 10 may be provided. The conveying portion 114 conveys the sheet S from the cassette 10 or the manual feeding tray 17 to the secondary transfer nip T2.

In contrast to the sheet S conveying process until the above-described secondary transfer nip T2, an image forming process of the image sent to the secondary transfer nip T2 at a similar timing will be described. First, although the image forming portions will be described, the respective color image forming portions Pa, Pb, Pc and Pd are constituted substantially similar to each other except that colors of toner used in developing devices 1a, 1b, 1c and 1d are yellow (Y), magenta (M), cyan (C), and black (K), respectively, which are different from each other. Therefore, in the following, as a representative, the image forming portion Pd for black will be described, and other image forming portions Pa, Pb and Pc will be omitted from description.

The image forming portion Pd is principally constituted by the developing device 1d, a charging device 2d, a photosensitive drum 3d, a photosensitive drum cleaner 4d, an exposure device 5d, a primary transfer roller 6d, and the like. A surface of a rotating photosensitive drum 3d is electrically charged uniformly in advance by the charging device 2d, and thereafter, an electrostatic latent image is formed by the exposure device 5d driven on the basis of a signal of image information. Then, the electrostatic latent image formed on the photosensitive drum 3d is developed into a toner image with use of a developer by the developing device 1d. Then, the toner image formed on the photosensitive drum 3d is primary-transferred onto an intermediary transfer belt 80 in response to application of a primary transfer voltage to the primary transfer roller 6d disposed while sandwiching the intermediary transfer belt 80 therebetween. Primary transfer residual toner slightly remaining on the photosensitive drum 3d is collected by the photosensitive drum cleaner 4d.

The intermediary transfer belt 80 as an image bearing member is stretched by the inner secondary transfer roller 14, and stretching rollers 15 and 16, and is driven in an arrow R2 direction in contact with the photosensitive drums 3a to 3d. The stretching roller 16 also functions as a driving roller for driving the intermediary transfer belt 80. The respective color image forming processes performed in parallel by the image forming portions Pa to Pd are carried out at timings each when an associated toner image is superposedly transferred successively onto an upstream toner image primarily transferred onto the intermediary transfer belt 80. As a result, finally, a full-color toner image is formed on the intermediary transfer belt 80 and is conveyed to the secondary transfer nip T2 while being carried on the intermediary transfer belt 80. Secondary transfer residual toner after passing through the secondary transfer nip T2 is removed from the intermediary transfer belt 80 by a belt cleaner 22.

In the above, by the above-described conveying process and the above-described image forming process, in the secondary transfer nip T2, a timing of the sheet S and a timing of the full-color toner image coincide with each other, so that secondary transfer is carried out. Thereafter, the sheet S is conveyed to a fixing device 50, in which heat and pressure are applied to the sheet S, so that the toner image is fixed on the sheet S. The fixing device 50 nips and conveys the sheet S on which the toner image is formed, and applies heat and pressure to the conveyed sheet S, so that the fixing device 50 fixes the toner image on the sheet S. That is, the toner of the toner image formed on the sheet S is melted and mixed by application of heat and pressure, and is fixed as the full-color image on the sheet S. The sheet S on which the toner image is fixed is discharged onto a discharge tray 95 provided outside an apparatus main assembly of the image forming apparatus 100. Or, in the case where another post-processing device (not shown) such as a finisher is connected to the apparatus main assembly of the image forming apparatus 100, the sheet S on which the toner image is fixed is conveyed to the post-processing device. The finisher apparatus performs, for example, punch processing in which the sheet S is perforated, stapling (processing) in which a plurality of sheets S are bundled and stapled, and the like processing.

<Developer>

In the image forming apparatus 100 of the present invention, as the developer, a two-component developer containing the toner and a carrier is used. The toner contains a binder resin, a colorant, and a parting agent. As the binder resin, a known binder resin can be used. For example, it is possible to use resin materials such as a vinyl copolymer represented by a styrene-(meth) acrylic copolymer, a polyester resin, a hybrid resin obtained by chemically bonding a vinyl copolymer and a polyester to each other, an epoxy resin, a styrene-butadiene copolymer, and the like. As the colorant, it is possible to use known colorants for yellow (Y), magenta (M), cyan (C), and black (K), respectively.

As the parting agent, for example, it is possible to cite aliphatic hydrocarbon waxes such as low-molecular weight polyethylene wax, low-molecular weight olefin copolymer wax, microcrystalline wax, Fischer-Tropsch wax, and paraffin wax; oxides of the aliphatic hydrocarbon waxes such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

<Controller>

As shown in FIG. 1, the image forming apparatus 1 includes a controller 101. A control constitution of the image forming apparatus 100 will be described using FIG. 2 while making reference to FIG. 1. Incidentally, to the controller 101, in addition to devices (portions) illustrated in FIG. 2, various devices such as respective portions constituting the image forming apparatus 100, and driving sources (motors and power sources) for driving these portions are connected. However, these devices are not the main object of the present invention herein, and therefore, will be omitted from illustration and description.

The controller 101 includes a CPU (central processing unit) 102, a ROM (read only memory) 103, and a RAM (random access memory) 104, and controls entirety of the image forming apparatus 100. In the ROM 103, various programs such as an image forming job and the like are stored. The controller 101 is capable of acquiring, for example, various data inputted from an operating portion 110, image data sent from an external device 1000 (see FIG. 1), or image data of an image read by the original reading device 130, or the like (hereinafter, these image data are referred to as inputted image data. These data acquired by the controller 101 are stored in the RAM 104. Incidentally, the RAM 104 is capable of temporarily storing a calculation (computation) processing result or the like with execution of the various programs.

The image forming apparatus 100 includes the operating portion 110 (see FIG. 1) including a display portion 111, and the operating portion 110 is connected to the controller 101. The controller 101 is capable of causing the display portion 111 to display various screens presenting the various programs and various data or the like, and receives input of a start of the various programs and input of the various data, and the like, in response to an operation by a user through the operating portion 110. Although described later, the operating portion 110 as an input portion is capable of input of a position of burrs formed on a perforated sheet S and a range of a perforated region.

When the controller 101 receives a start instruction of an image forming job, the controller 101 executes image forming processing (program) stored in the ROM 103, and controls the image forming portions Pa to Pd for forming an image on the sheet S. An image processing portion 105 subjects the image data, acquired by the controller 101, to color conversion processing or half-tone processing (medium tone processing). Here, the user is capable of setting, as a kind of the half-tone processing, AM screen processing or error diffusion processing.

The image processing portion 105 outputs image data for image output after subjecting the input image data to the half-tone processing (this image data for image output is referred to as output image data). On the basis of the output image data, the controller 101 causes the image forming portions Pa to Pd to form the toner images.

The AM screen processing is processing such that a half-tone is expressed by periodical dot arrangement, and includes, for example, dot screen processing, line screen processing, and the like. The dot screen processing expresses shades (gradations) of color by changing a size of dots which are equidistantly arranged. In the dot screen processing, a shape of each of the dots is a circle and the dots are equidistantly arranged, so that a periodical dot pattern is generated. In the line screen processing, a periodical dot pattern is generated, but different from the dot screen processing, the shades of color are not expressed by a magnitude of the size of the dots, but are expressed by changing a thickness of lines which are equidistantly arranged. In this embodiment, a direction (screen angle) of the dots in the AM screen processing is determined in advance for each of the colors. For example, the screen angle for yellow (Y) is taken as 0 degrees, and on the basis of the screen angle for yellow, screen angles for cyan (C), black (K), and magenta (M) are set clockwise to 15 degrees, 45 degrees, and 75 degrees, respectively, and thus are different for each color.

The error diffusion processing is processing such that a dot pattern without periodicity is generated. In the error diffusion processing, on the basis of density information on pixels constituting an image of inputted image data, first, a density of one pixel (this pixel is referred to as a noting pixel) is binarized, and an error (difference) between a density after binarization and a density before the binarization is acquired. Then, a value obtained by multiplying the error by a weighing coefficient (this value is referred to as a diffusion value) is acquired, and the diffusion value is added to each of other pixels falling within a predetermined range from the noting pixel. Next, although either one of these other pixels falling within the predetermined range from the noting pixel is subjected to the binarization (this pixel is referred to as a subsequent noting pixel), a density before the binarization in this case is a density to which the diffusion value is added. Thereafter, in the subsequent noting pixel, an error between a density after the binarization and a density before the binarization is acquired, and the diffusion value is added to each of other pixels falling within a predetermined range from the subsequent noting pixel. Thus, the error of the noting pixel is diffused so as to be added to peripheral pixels, whereby there is no periodicity in error distribution degree, and therefore, in the error diffusion processing, the dot pattern without periodicity is generated.

<Operating Portion>

Figure 3:
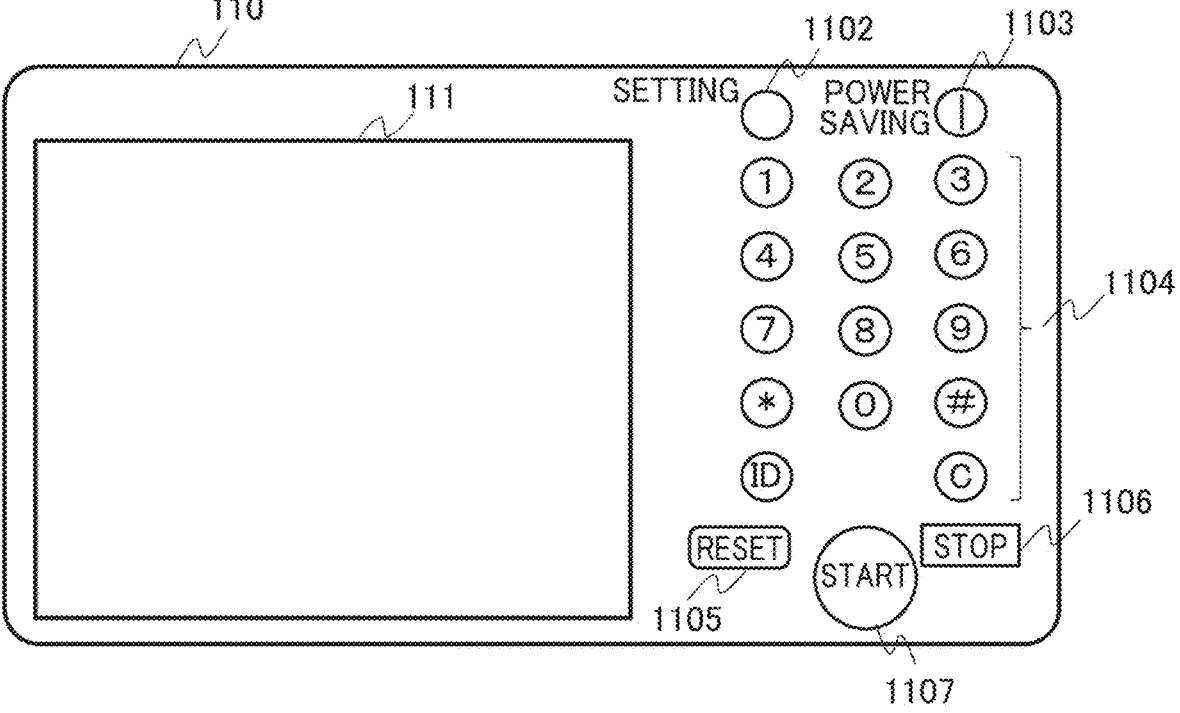
FIG. 3 is a schematic view showing an operating portion.

The operating portion 110 as a selecting portion (input portion) will be described using FIG. 3. As shown in FIG. 3, the operating portion 110 includes a display portion 111 such as a liquid crystal monitor, and hardware keys. The display portion 111 may be a touch panel on which the user is capable of performing a touch operation, and is capable of displaying a screen including, as touch-operable software keys, various buttons and switches. At the display portion 111, a "sheet selection screen" (see FIG. 4) and a "replacement/non-replacement selection screen" (see FIG. 6), and the like which are described later are displayed.

As the hardware keys, for example, there are a setting key 1102, a power saving key 1103, a hardware key group 1104, a reset key 1105, a stop key 1106, a start key 1107, and the like. The start key 1107 has a function of instructing starts of, for example, reading and printing (copying) of an original image and other operations. In the start key 1107, unshown LEDs of two colors of green and red are incorporated, and the start key 1107 indicates that the start of the operation is enabled during turning-on of the green LED, and indicates that the start of the operation is disabled during turning-on of the red LED. The stop key 1106 has a function of once stopping image formation or the like during operation. The hardware key group 1104 includes, for example, numeric keys, a clear key, an authentication key, and the like.

The power saving key 1103 has a function of shifting an operation in a mode of the image forming apparatus 100 from an operation in a normal mode to an operation in a sleep mode in which the image forming apparatus 100 is on standby in power saving or of returning the operation in the mode of the image forming apparatus 100 from the operation in the sleep mode to the operation in the normal mode. That is, the image forming apparatus 100 shifts in operation mode to the sleep mode when the user presses the power saving key 1103 in the operation in the normal mode, and shifts in operation mode to the normal mode when the user presses the power saving key 1103 in the operation in the sleep mode. The setting key 1102 is used when, for example, a setting of a kind of the sheet S or the like is made. The reset key 1105 is used when, for example, the set kind of the sheet S is canceled.

<Sheet Selection Screen>

At the display portion 111 of the operating portion 110, the "sheet selection screen" is displayed. The "sheet selection screen" is displayed at the display portion 111, for example, in the case where the user operates a sheet kind selection button from a "menu screen" (not shown) displayed at the display portion 111 or in the case where the user opens the cassette 10 or the manual feeding tray 17. The "sheet selection screen" will be described using FIG. 4.

Figure 4:
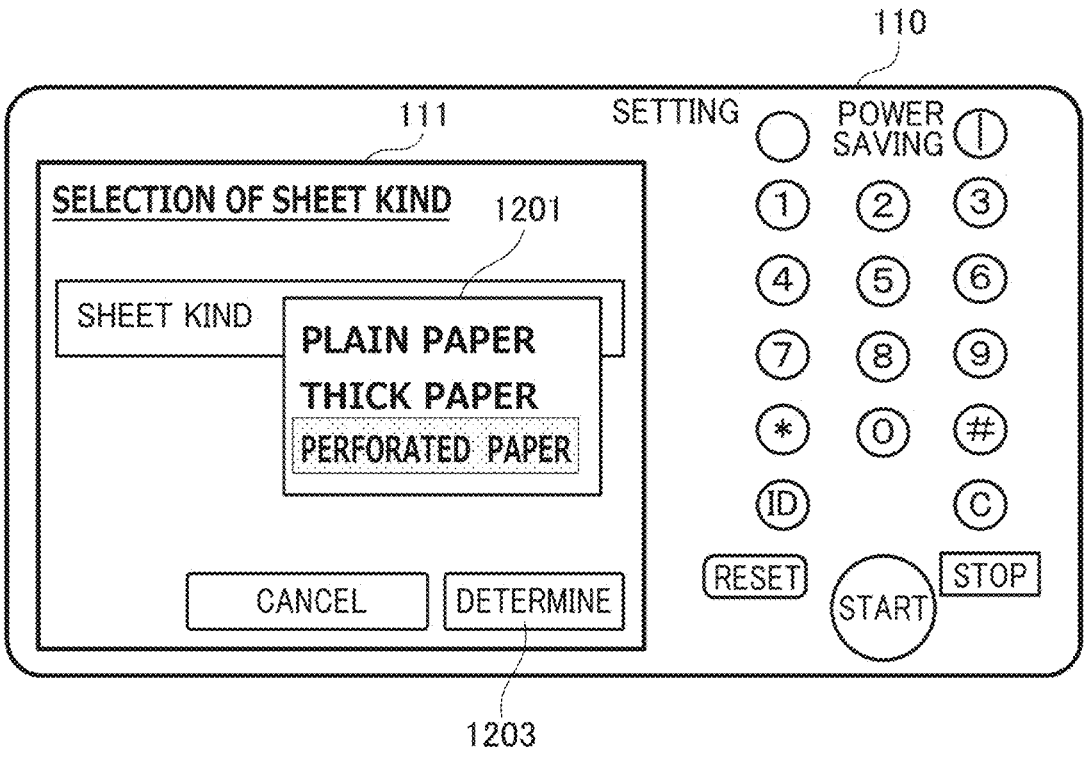
FIG. 4 is a schematic view showing a sheet selection screen.

As shown in FIG. 4, in the "sheet selection screen", kinds of the sheet S which are stored in advance in the ROM 103 (see FIG. 2) and on which the image is capable of being formed by the image forming apparatus 100 are selectably displayed in a dialog box 1201. Here, "plain paper", "thick paper", and "perforated paper" (perforated sheet) are displayed, but the user is capable of displaying other kinds in which the image is capable of being formed, by scrolling a screen displayed in the dialog box 1201. The user is capable of selecting the kind of the sheet S from a plurality of kinds displayed in the dialog box 1201. The selected kind of the sheet S is determined by operating a determination button 1203.

<Image Forming Processing>

Figure 2:
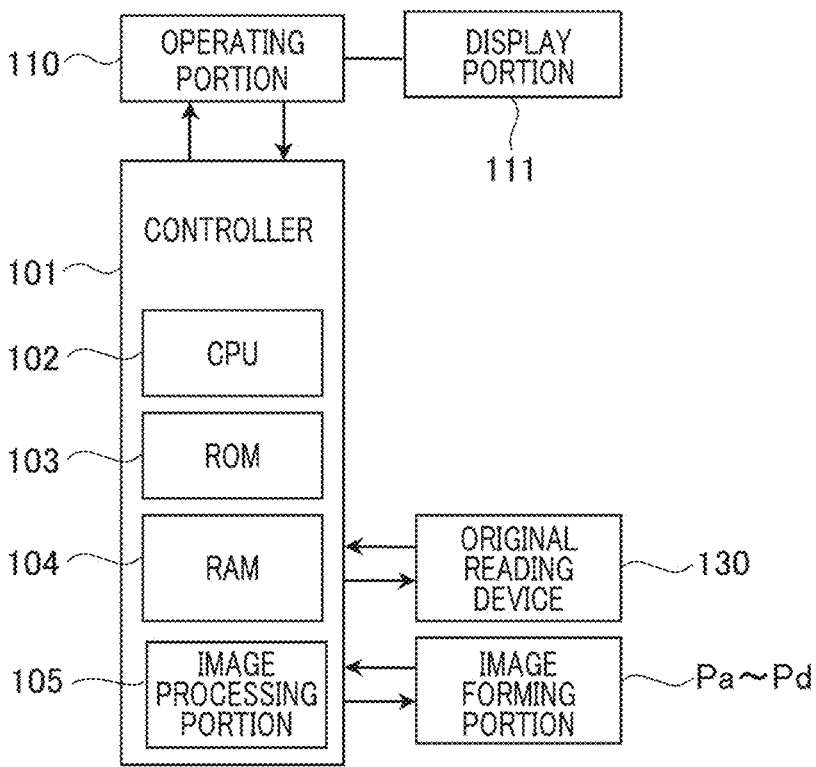
FIG. 2 is a control block diagram showing a control constitution of the image forming apparatus.

Next, image forming processing of the image forming apparatus 100 will be described using FIGS. 5 to 9 while making reference to FIG. 2. The image forming processing is started by receiving a start instruction of the image forming job by the controller 101. Incidentally, in the following, before the user starts the image forming job, from the operating portion 110, the AM screen processing has already been set as the half-tone processing.

Figure 5:
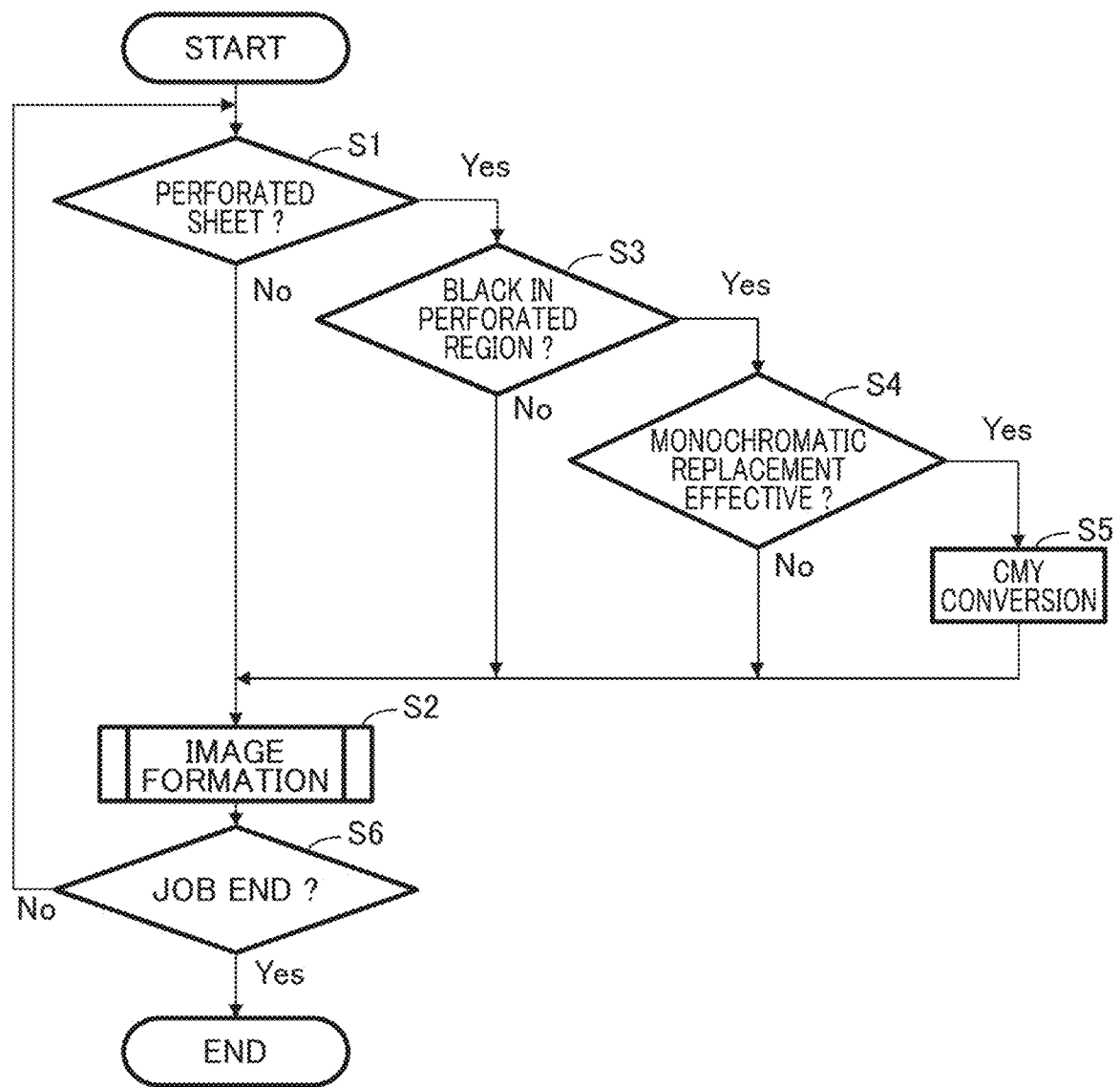
FIG. 5 is a flowchart showing image forming processing in a first embodiment.

As shown in FIG. 5, when the controller 101 receives the start instruction of the image forming job, the controller 101 discriminates whether or not the kind of the sheet S is the perforated sheet S (S1). The controller 101 discriminates whether or not the kind of the sheet S is the perforated sheet S, depending on whether or not the kind of the sheet S selected by the user from the above-described "sheet selection screen" (see FIG. 4) is the perforated sheet S. Incidentally, when a constitution in which the image forming job includes sheet information on the sheet S is employed, on the basis of the sheet information of the image forming job, the controller 101 may discriminate whether or not the kind of the sheet S is the perforated sheet S.

In the case where the kind of the sheet S is not the perforated sheet S (No of S1), the controller 101 causes the image forming apparatus 100 to form an image with CMYK toner (S2). That is, in the case where the kind of the sheet S is not the perforated sheet S, the controller 101 causes the image processing portion 105 to subject the inputted image data to the AM screen processing set in advance by the user, and causes the image forming portions Pa to Pd to form the image on the basis of output image data. The output image data are used when the photosensitive drums $3a$ to $3d$ are exposed to light by the exposure devices $5a$ to $5d$. After the photosensitive drums $3a$ to $3d$ are exposed to light on the basis of the output image data by the exposure devices $5a$ to $5d$, the controller 101 controls the developing devices $1a$ to $1d$ so that electrostatic latent images are developed into toner images by the CMYK toner on the basis of color information stored in advance in the inputted image data. Thereafter, the toner images formed on the photosensitive drums $3a$ to $3d$ are transferred onto the sheet S by way of the intermediary transfer belt 80.

After the image is formed on the sheet S, the controller 101 discriminates whether or not the image forming job is ended (S6). In the case where the images are formed on sheets S in number designated by the user, the controller 101 discriminates that the image forming job is ended (Yes of S6) and the controller 101 ends the image forming processing. In the case where the image forming job is not ended (No of S6), the controller 101 causes the processing to return to the processing of the step S1 in order to carry out formation of an image on a subsequent sheet S, and causes the image forming apparatus 100 to repeat the image forming processing until the images are formed on a designated number of sheets S.

On the other hand, in the case where the kind of the sheet S is the perforated sheet S (Yes of S1), the controller 101 discriminates whether or not the image formed in a processing region is an image of a monochromatic K toner (black) (S3).

In the inputted image data, information on the perforated region is stored, and the controller 101 specifies the perforated region in accordance with the information.

In the case where the image formed in the perforated region is not the image of the monochromatic K toner (No of S3), the controller 101 causes the image forming portions Pa to Pd to form images with the CMYK toner in all regions including the perforated region (S2). After the images are formed on the perforated sheet S, the controller 101 causes the processing to go to the processing of the above-described step S6.

In the case where the image formed in the perforated region is the image of the monochromatic K toner (Yes of S3), the controller 101 discriminates whether or not a monochromatic replacement function of replacing monochromatic image data with image data of a plurality of colors for reproducing a pseudo color is effective (S4). Discrimination as to whether or not the monochromatic replacement function is effective is made on the basis of selection by the user using a "RNSS" (see FIG. 6) described later.

In the case where the monochromatic replacement function is effective (Yes of S4), for all monochromatic black regions in one page, the controller 101 replaces the monochromatic K toner (black) with a combination of CMY toner replacing black in a pseudo manner (S5). Here, the black replaced in the pseudo manner with use of the CMY toner without using the K toner is referred to as a process black. In the case where the monochromatic replacement function is not effective, the image processing portion 105 carries out color conversion for generating, from the inputted image data, image data of four color components of cyan, magenta, yellow, and black. On the other hand, in the case where the monochromatic replacement function is effective, the image processing portion 105 carries out color conversion processing for generating, from the inputted image data, image data of three color components of cyan, magenta, and yellow. Then, on the basis of the inputted image data of the three color component of cyan, magenta, and yellow, the controller 101 causes the image forming portions Pa to Pd to carry out image forming processing so that the monochromatic black region is replaced with the process black (region) reproduced with the CMY toner (S2). Thus, the toner image of the monochromatic K toner (black) is made replaceable with a replacement toner image formed with the three colors of the CMY toner. Incidentally, in the step S5, a color mixing region including the K toner is not replaced with the CMY toner.

In the case where the monochromatic replacement function is not effective (No of S4), the controller 101 causes the image forming portions Pa to Pd to form the images with the CMYK toner without replacing the monochromatic K toner (black) with the combination of the CMY toner (S2).

Incidentally, the controller 101 performs the above-described replacement from the monochromatic K toner to the CMY toner by making reference to a monochromatic replacement table stored in the ROM 103. In the monochromatic replacement table, with respect to the monochromatic K toner, print amounts of the C toner, the M toner, and the Y toner after the replacement are defined as the substantially same value. The print amount of each of the colors (CMY) is discretized in 256 stages of "0 to 255" (gradation values) and is determined by designating this gradation value. For example, in the case where the monochromatic K toner with a maximum density (gradation value: 255) is replaced with the CMY toner, in the monochromatic replacement table, values capable of reproducing the pseudo color by designating a gradation value of "150" for each of the C toner, the M toner, and the Y toner are stored.

<Replacement/Non-Replacement Selection Screen>

Figure 6:
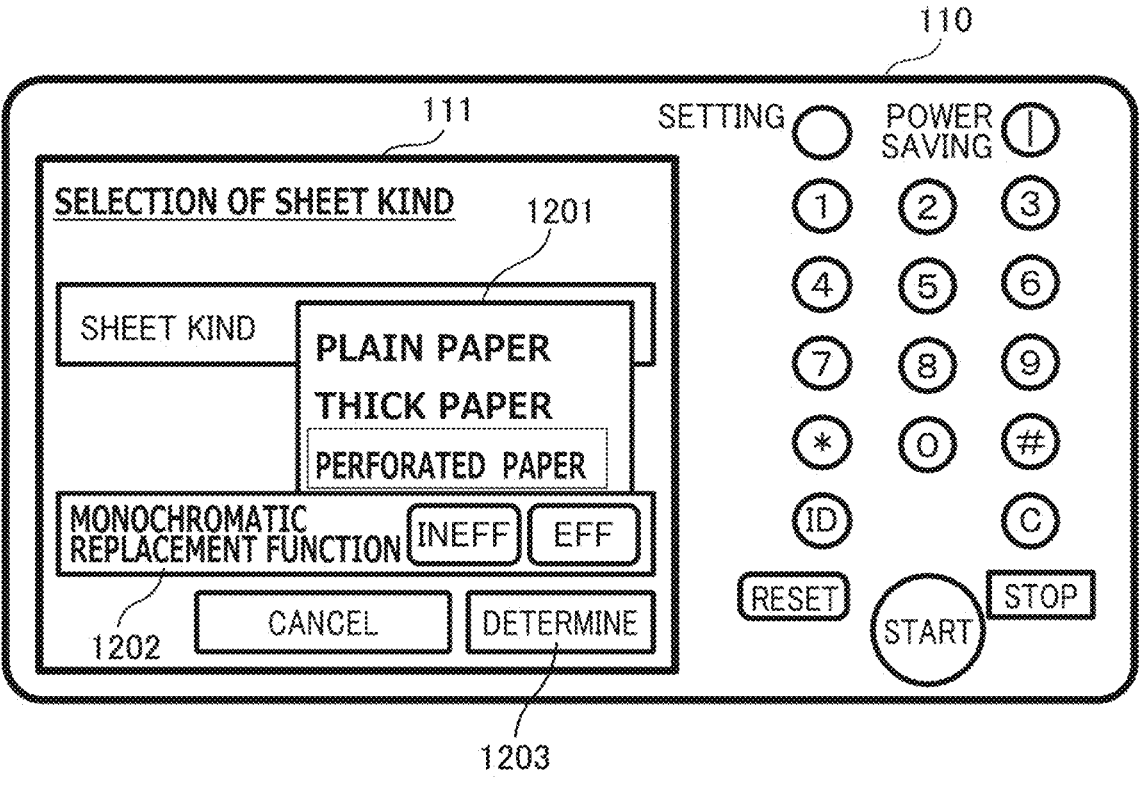
FIG. 6 is a schematic view showing a replacement/non-replacement selection screen.

Next, the "replacement/non-replacement selection screen" will be described using FIG. 6. The "replacement/non-replacement selection screen" is displayed at the display portion 111 of the operating portion 110 as shown in FIG. 6 in the case where the "perforated paper" is selected as the kind of the sheet S in the "sheet selection screen" (see FIG. 4). In FIG. 6, as the "replacement/non-replacement selection screen", a selection button display portion 1202 is displayed in a pop-up manner.

At the selection button display portion 1202, in order to make execution/non-execution of the monochromatic replacement function (mode) selectable by the user, an "EFF" (effective) button for making the monochromatic replacement function effective and a "NON-EFF" (non-effective) button for making the monochromatic replacement function non-effective are displayed. The user operates either one of the "EFF" button and the "NON-EFF" button at the selection button display portion 1202 and thus is capable of selecting that the monochromatic replacement function is made effective or non-effective. Thereafter, in response to the operation of a "DETERMINE" button 1203 by the user, the monochromatic replacement function is determined as either one of "EFF (execution)" or "NON-EFF (non-execution)"

The determined kind of the sheet S and the determined execution or non-execution of the monochromatic replacement function are stored in the RAM 104 (see FIG. 2) of the controller 101. During execution of the image forming job, the controller 101 makes reference to the kind of the sheet S and the execution or non-execution of the monochromatic replacement function, which are stored in the RAM 104.

<Occurrence or Non-Occurrence of Image Defect>

As has already be described above, when the toner image is transferred onto the perforated sheet S, an image defect such that unintended electric discharge occurs in the perforated region where the burrs generate and the toner is transferred onto an unintended portion and that a shape and an arrangement of dots forming the image are disordered and thus a color tint of the toner image changes can arise.

Particularly, in the case where a monochromatic image subjected to the AM screen processing is formed, the image defect due to the burrs of the sheet was liable to occur in the perforated region. On the other hand, the image forming apparatus 100 is capable of suppressing the image defect due to the burrs of the sheet by replacing the color information of the image formed in the perforated region where the burrs generate with the combination of the CMY toner capable of replacing black in the pseudo manner from the K (black) toner (see S5 of FIG. 5). A table 1 shows a result of evaluation of occurrence or non-occurrence of the image defect in the perforated region due to the burrs of the sheet S when the CMY toner are used and when the monochromatic K toner is used in the case where the AM screen processing is performed as the half-tone processing.

TABLE 1

| TONER USED | CMY | ONLY K |
|---|---|---|
| IMAGE DEFECT | NOT OCCURRED | OCCURRED |

Figure 7:
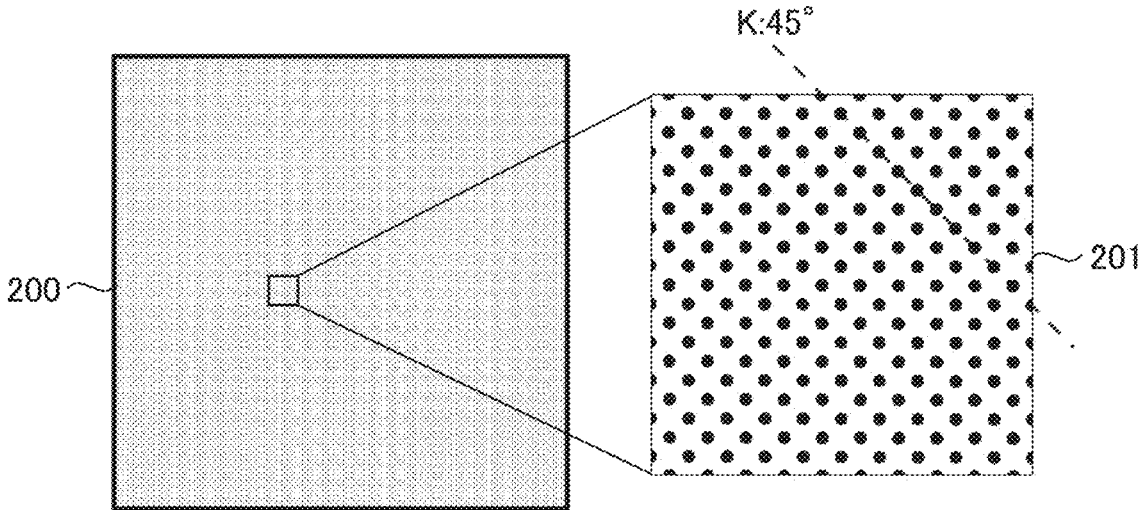
FIG. 7 is a schematic view for illustrating a print ratio.

The occurrence or non-occurrence of the image defect in the table 1 was evaluated in the following manner. First, a toner image was formed on the perforated sheet S on the basis of predetermined color information. The predetermined color information in this case is color information determined so that a print ratio becomes 30% in the case where the monochromatic K toner ("ONLY K") in the "TONER USED" row in the table 1 is used, and becomes a print ratio determined on the basis of a well-known technique, in which black of the image formed with the monochromatic K toner can be reproduced in the pseudo manner, in the case where the CMY toner ("CMY") in the "TONE USED" row in the table 1 is used. Incidentally, the print ratio mentioned in this case is a ratio (area ratio) of an area in which the toner is present in a minute region 201 of an image forming region 200 as shown in FIG. 7 on the basis of the print ratio of "100%" taken when the toner is present in a whole area of the minute region 201 of the image forming region 200.

In the image forming apparatus 100, the color information in the case where the monochromatic K toner is used corresponds to color information before the replacement, and the color information in the case where the CMY toner are used corresponds to color information after the replacement. The user discriminated whether or not the image defect occurred by checking the toner image formed on the basis of each of the above-described pieces of the color information, by eye observation.

As shown in the table 1, in the case where the monochromatic K toner before the replacement was used, the image defect due to the burrs of the sheet S occurred. On the other hand, in the case where the CMY toner after the replacement were used, the image defect due to the burrs of the sheet S did not occur. Here, in FIG. 8, an image formed in the perforated region with the monochromatic K toner before the replacement is shown, and in FIG. 9, an image formed in the perforated region with the CMY toner after the replacement is shown.

Figure 8:
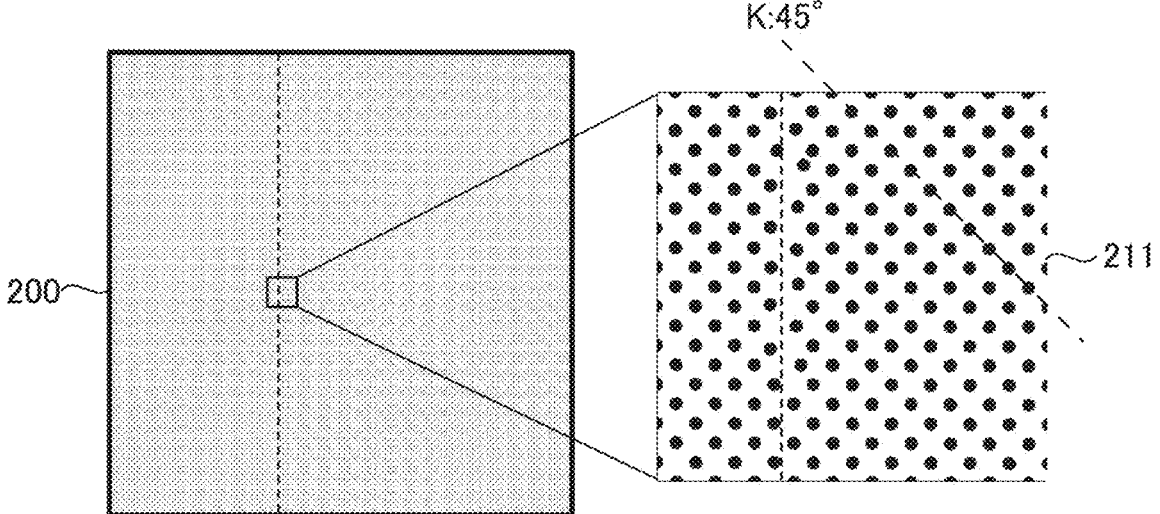
FIG. 8 is a schematic view showing an image formed with monochromatic K toner.

As shown in FIG. 8, the image is formed by arranging dots of the K toner linearly (screen angle: 45°). However, in the perforated region, as regards a part of the dots, disordering such that a shape thereof changes or the dots are not linearly arranged is observed (see minute region 211). At this time, a phenomenon occurred in the image formed in the image forming region 200 is as follows. The perforated region where the burrs generate is a portion where a thickness of the sheet S locally changes or the sheet S is perforated. Then, when the toner image is transferred onto the perforated sheet S in the secondary transfer nip T2 (see FIG. 1), unintended local electric discharge can generate in the perforated region. By this unintended electric discharge, the toner is transferred onto an unintended portion, so that the shape and the arrangement of the dots are disordered. Therefore, the toner image formed in the perforated region seems, compared with the toner image formed in another region, different in color tint, so that this appears as the image defect.

Figure 9:
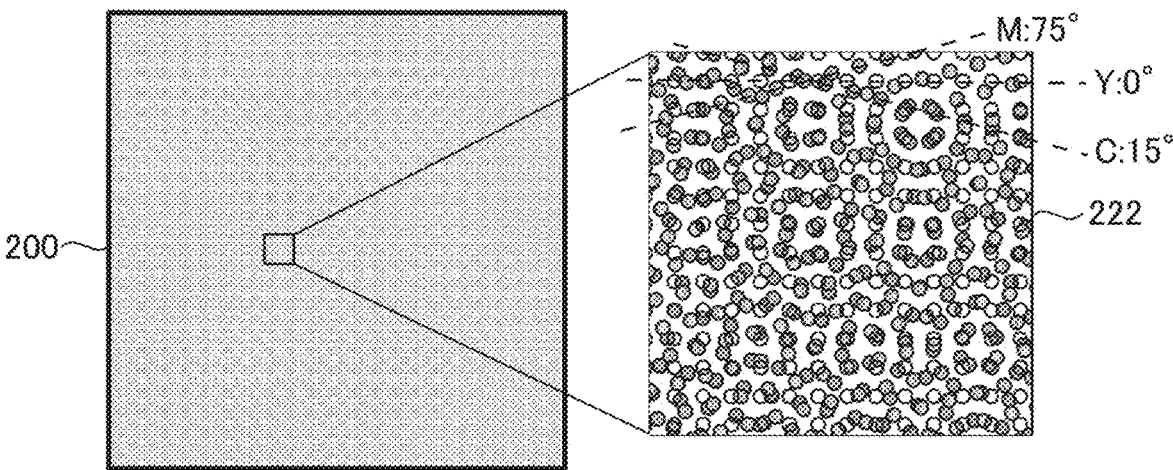
FIG. 9 is a schematic view showing an image formed with CMY toner.

On the other hand, as shown in FIG. 9, in the case where the image is formed with the CMY toner, arrangement directions (screen angles) of the dots of the respective colors are different from each other, and therefore, a state which is called a Rosetta pattern is formed (see minute region 222). The Rosetta pattern is a pattern of a disordered dot arrangement consisting of complicated interference. Even when the unintended local electric discharge generates in the above-described perforated region and the shape and the arrangement of the dots are disordered, the color tint in the perforated region is not changed compared with the color tint in another region.

As described above, in the image forming apparatus 100, in the case where the kind of the sheet S is the perforated sheet S, the image of the monochromatic K toner can be formed by being replaced with the image (replacement toner image) of the pseudo color with the CMY toner. At that time, the user is capable of selecting whether or not the monochromatic replacement function of replacing the monochromatic K toner with the CMY toner is made effective or non-effective, by using the "replacement/non-replacement selection screen" (see FIG. 6). Thus, in the case where the image is formed on the perforated sheet S, the user is capable of selecting that the monochromatic replacement function is made effective or non-effective, depending on a status of use or a product, so that it is possible to provide a high-quality product. That is, in the case where the selection that the monochromatic replacement function is made effective is made, as described above, the monochromatic K toner is replaced with the CMY toner, and the image of the pseudo color in which dots of each of the CMY toner are arranged at different screen angles with the amount screen processing is formed. The image of the pseudo color is different in dot arrangement for each color when compared with the image of the monochromatic K toner in which the dots are arranged in one direction, so that even when the unintended electric discharge generates in the perforated region, disordering of the shape and the arrangement of the dots does not readily appear. Accordingly, even when the toner image formed in the perforated region and the toner image formed in a region other than the perforated region are compared with each other, the color tint is unchanged. Thus, in the case where the image forming apparatus 100 forms the image on the perforated sheet S, the image forming apparatus 100 is capable of reducing a degree of appearance of the disordering of the local dot shape and arrangement, so that it is possible to suppress the occurrence of the image defect due to the burrs of the sheet S.

Incidentally, in the image forming apparatus 100, the user is made capable of arbitrarily selecting execution or non-execution of monochromatic replacement in the "replacement/non-replacement selection screen" (see FIG. 6). This is because depending on a use environment, a reference for color design, and the like of the user, a possibility that color information after the replacement is not optimized is considered. If so, the replacement or non-replacement of the color information may desirably be selectable independently in each condition. In an unexpected situation including malfunction of the image forming apparatus 100, in the case where the user discriminates that the monochromatic replacement function does not normally operate, it is desirable that the monochromatic replacement function can be set to "non-effective". Therefore, depending on a use status and a product of individual users, selection that the monochromatic replacement function is made effective or non-effective can be made, so that it is possible to provide a higher-quality product.

Second Embodiment

In the above-described embodiment, irrespective of whether or not the region is the perforated region or the region other than the perforated region, in the whole area of the perforated sheet S, the toner is made changeable from the monochromatic K toner to the CMY toner, but the present invention is not limited thereto. For example, only for the toner image formed in the perforated region, the toner may also be made changeable from the monochromatic K toner to the CMY toner.

Image forming processing of the image forming apparatus 100 of a second embodiment capable of realizing such a change will be described using FIGS. 10 to 13 while making reference to FIG. 2. The image forming processing is started by receiving a start instruction of the image forming job by the controller 101. Incidentally, in the image forming processing shown in FIG. 10, processes similar to those in the image forming processing shown in FIG. 5 will be briefly described or omitted from description.

Figure 10:
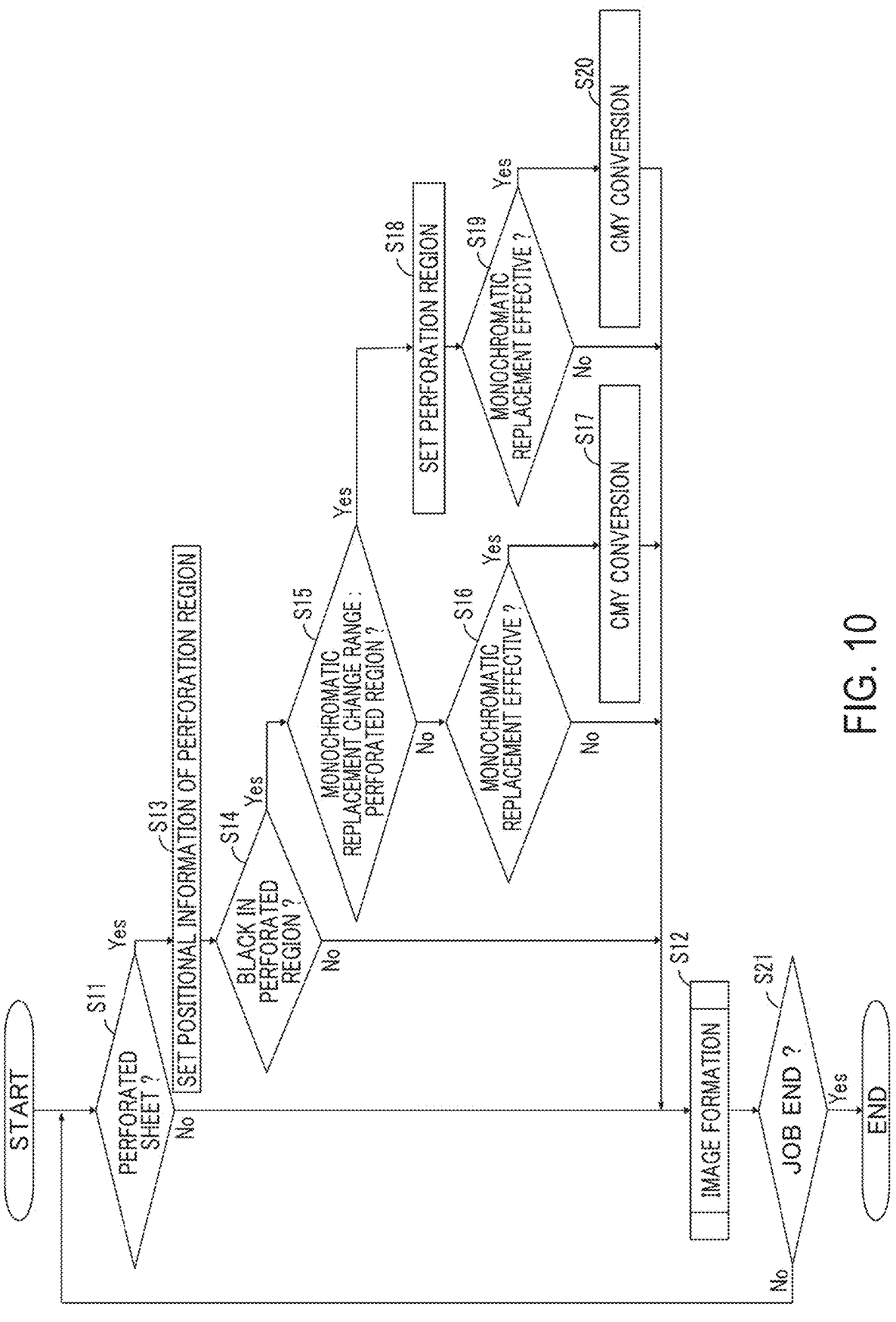
FIG. 10 is a flowchart showing image forming processing in a second embodiment.

As shown in FIG. 10, when the controller 101 receives the start instruction of the image forming job, the controller 101 discriminates whether or not the kind of the sheet S is the perforated sheet S (S11). The controller 101 discriminates whether or not the kind of the sheet S is the perforated sheet S, depending on whether or not the kind of the sheet S selected by the user from the above-described "sheet selection screen" (see FIG. 4) is the perforated sheet S. In the case where the kind of the sheet S is not the perforated sheet (No of S11) S, the controller 101 causes the image processing portion 105 to subject the inputted image data to the AM screen processing set in advance by the user, and causes the image forming portions Pa to Pd to form the image on the basis of output image data (S12).

After the image is formed on the sheet S, the controller 101 discriminates whether or not the image forming job is ended (S21). In the case where the images are formed on sheets S in number designated by the user, the controller 101 discriminates that the image forming job is ended (Yes of S21), and the controller 101 ends the image forming processing. In the case where the image forming job is not ended (No of S21), the controller 101 causes the processing to return to the processing of the step S11 in order to carry out formation of an image on a subsequent sheet S, and causes the image forming apparatus 100 to repeat the image forming processing until the images are formed on a designated number of sheets S.

On the other hand, in the case where the kind of the sheet S is the perforated sheet S (Yes of S11), the controller 101 sets positional information in a processing region (S13).

A setting of the positional information of the perforated region is made on the basis of a coordinate setting by the user with use of a "perforation position setting screen" (see FIG. 11) described later. After the positional information of the perforated region is set, on the basis of the inputted image data and the set positional information, the controller 101 discriminates whether or not the image to be formed in the perforated region is an image of the monochromatic K toner (S14). In the case where the image formed in the perforated region is not the image of the monochromatic K toner (No of S14), the controller 101 causes the image forming portions Pa to Pd to form images with the CMYK toner in all regions (whole area of the perforated sheet S) including the perforated region (S12). After the images are formed on the perforated sheet S, the controller 101 causes the processing to go to the processing of the above-described step S21.

In the case where the image formed in the perforated region is the image of the monochromatic K toner (Yes of S14), the controller 101 discriminates whether a range in which the monochromatic replacement function is performed is only the perforated region or all the regions (whole area of the perforated sheet S) including the perforated region (S15). On the basis of a replacement range setting by the user with use of a "replacement range setting screen"

(see FIG. 12) described later, the controller 101 discriminates whether the range in which the monochromatic replacement function is performed is only the perforated region or the whole area of the perforated sheet S.

In the case where the range in which the monochromatic replacement function is performed is the whole area of the perforated sheet S, not only the perforated region (No of S15), the controller 101 discriminates whether or not the monochromatic replacement function is effective (S16). Discrimination as to whether or not the monochromatic replacement function is effective is made on the basis of selection by the user using a selection button display portion 1202 (see FIG. 12) displayed on a "replacement range setting screen" described later.

In the case where the monochromatic replacement function is not effective (No of S16), the controller 101 causes the image forming portions to form the image with the CMYK toner in the whole area of the perforated sheet S on the basis of the color information set for the inputted image data (S21). On the other hand, in the case where the monochromatic replacement function is effective (Yes of S16), with respect to all the monochromatic black regions formed in the whole area of the perforated sheet S in the inputted image data, the controller 101 replaces the monochromatic K toner (black) with the CMY toner reproducing the black in the pseudo manner (S17). Thereafter, the controller 101 executes processes of steps S12 and S21.

On the other hand, in the case where the range in which the monochromatic replacement function is performed is only the perforated region (Yes of S15), the controller 101 sets a range of the perforated region (S18). The setting of the range of the perforated region is made by a user setting using a region width setting box 1209 (see FIG. 12) displayed on the "replacement range setting screen" described later. Thereafter, the controller 101 discriminates whether or not the monochromatic replacement function is effective (S19).

In the case where the monochromatic replacement function is effective (Yes of S19), for all monochromatic black regions formed in the perforated region, the controller 101 replaces the monochromatic K toner (black) with a combination of CMY toner capable of replacing black in a pseudo manner (S20). Therefore, the controller 101 executes the processes of the steps S12 and S21. In this case, for the inputted image data on the perforated region, the controller 101 replaces the monochromatic K toner with the combination of the CMY toner, and for the inputted image data on a region other than the perforated region, the controller 101 does not replace the monochromatic K toner with the combination of the CMY toner, and then causes the image forming portions to form the image (S12). On the basis of the position of the perforations, the controller 101 is capable of specifying the inputted image data on the perforated region and the inputted image data on the region other than the perforated region.

In the case where the monochromatic replacement function is not effective (No of S19), irrespective of whether the region is the perforated region or the region other than the perforated region, the controller 101 causes the image forming portions to form the image with the CMYK toner on the basis of the color information set for the inputted image data (S12). After the image is formed on the perforated sheet S, the controller 101 causes the processing to go to the process of the step S21.

<Perforation Position Setting Screen>

On the display portion 111, a "perforation position setting screen" is displayed (see S13 of FIG. 10). The "perforation position setting screen" is displayed at the display portion

111 in the case where for example, the user operates a predetermined setting start button from a "menu screen" (not shown) displayed at the display portion 111. The "perforation position setting screen" will be described using FIG. 11.

Figure 11:
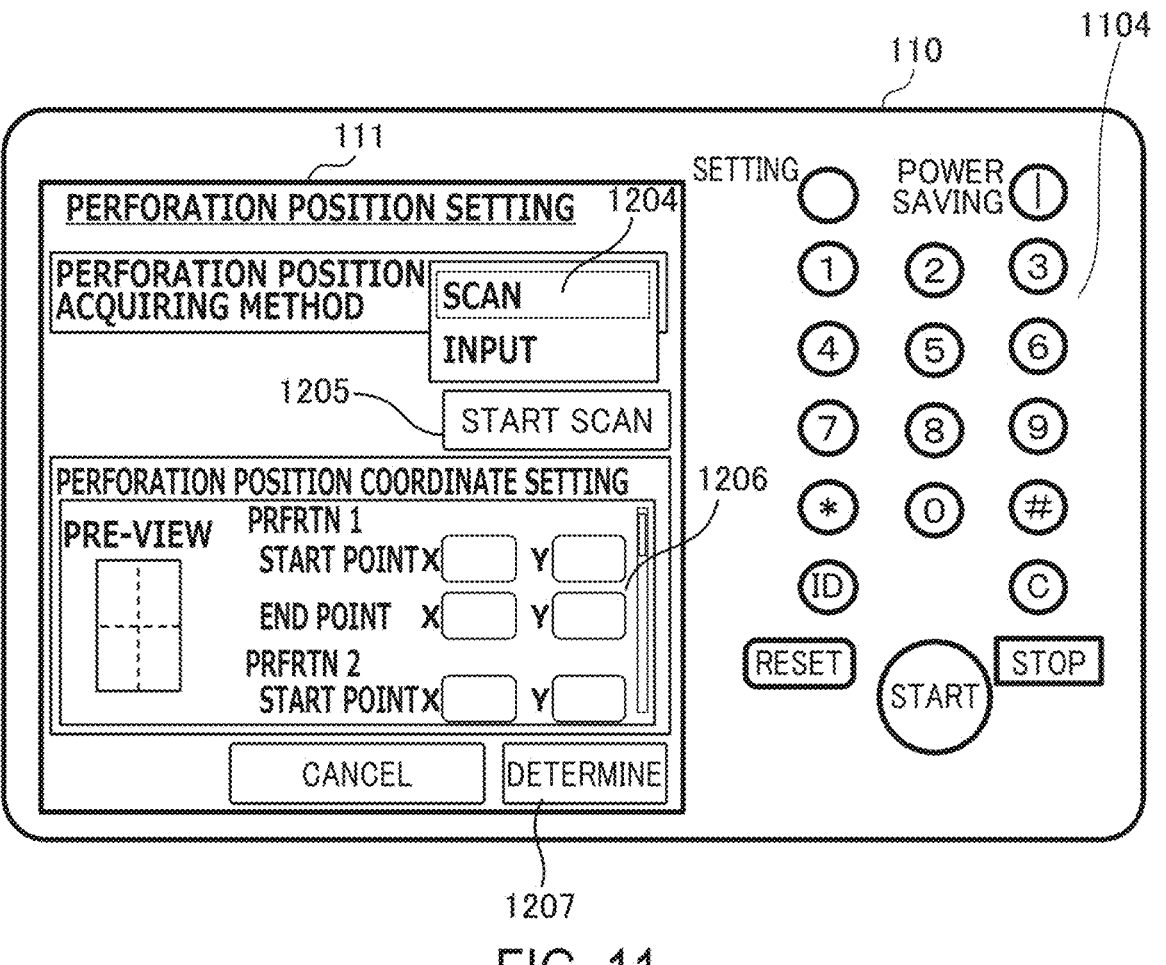
FIG. 11 is a schematic view showing a perforation position setting screen.

As shown in FIG. 11, on the "perforation position setting screen", a dialog box 1204 from which a perforation position acquiring method for acquiring a coordinate position of the perforations of the perforated sheet S is selectable is shown. In this embodiment, as the perforation position acquiring method, an example in which "SCAN" and "INPUT" which are stored in advance in the ROM 103 is shown. The "SCAN" is a method in which a position of a perforation (burr) of the perforated sheet S is read by the original reading device 130 (see FIG. 1).

In the case where the user selects the "SCAN" as the perforation position acquiring method, the user places the perforated sheet S, on which the image is not formed, on the original reading device 130 (see FIG. 1), and then presses down a scan start button 1205. Then, the original reading device 130 reads the position of the perforation (burr) on the perforated sheet S, and the read position (start coordinate and end coordinate) of the perforation is displayed on a position coordinate setting box 1206. In an example shown in FIG. 11, as displayed on a pre-view screen, two perforations are formed on the perforated sheet S, so that a start coordinate and an end coordinate are displayed for each of a "PRFRTN (perforation) 1" and a "PRFRTN 2". A "DETERMINE" button 1207 is pressed down by the user, so that the start coordinate and the end coordinate of each perforation are stored in the RAM 104 (see FIG. 2). Incidentally, as desired, the user may be capable of changing the start coordinate and the end coordinate of each perforation displayed on the position coordinate setting box 1206 by operating numerical keys of a hardware key group 1104.

The "INPUT" is a method in which the user directly inputs the start coordinate and the end coordinate of each perforation of the perforated sheet S without reading the perforated sheet S by the original reading device 130. The user selects the "INPUT" on the dialog box 1204, and then operates numerical keys of the hardware key group 1104 after designating an arbitrary input column of the position coordinate setting box 1206, so that the user is capable of inputting the start coordinate and the end coordinate of each perforation of the perforated sheet S. Then, the "DETERMINE" button 1207 is pressed down by the user, so that the start coordinate and the end coordinate of each perforation inputted by the user are stored in the RAM 104 (see FIG. 2). Incidentally, the above-described perforation position acquiring method is an example, and may also be not necessarily executed in the above-described manner.

<Replacement Range Setting Screen>

Next, the "replacement range setting screen" (see S15 and S18 of FIG. 10) will be described using FIG. 12. The "replacement range setting screen" is displayed at the display portion 111 in the case where for example, the user operates a predetermined replacement range setting button from a "menu screen" (not shown) displayed at the display portion 111.

Figure 12:
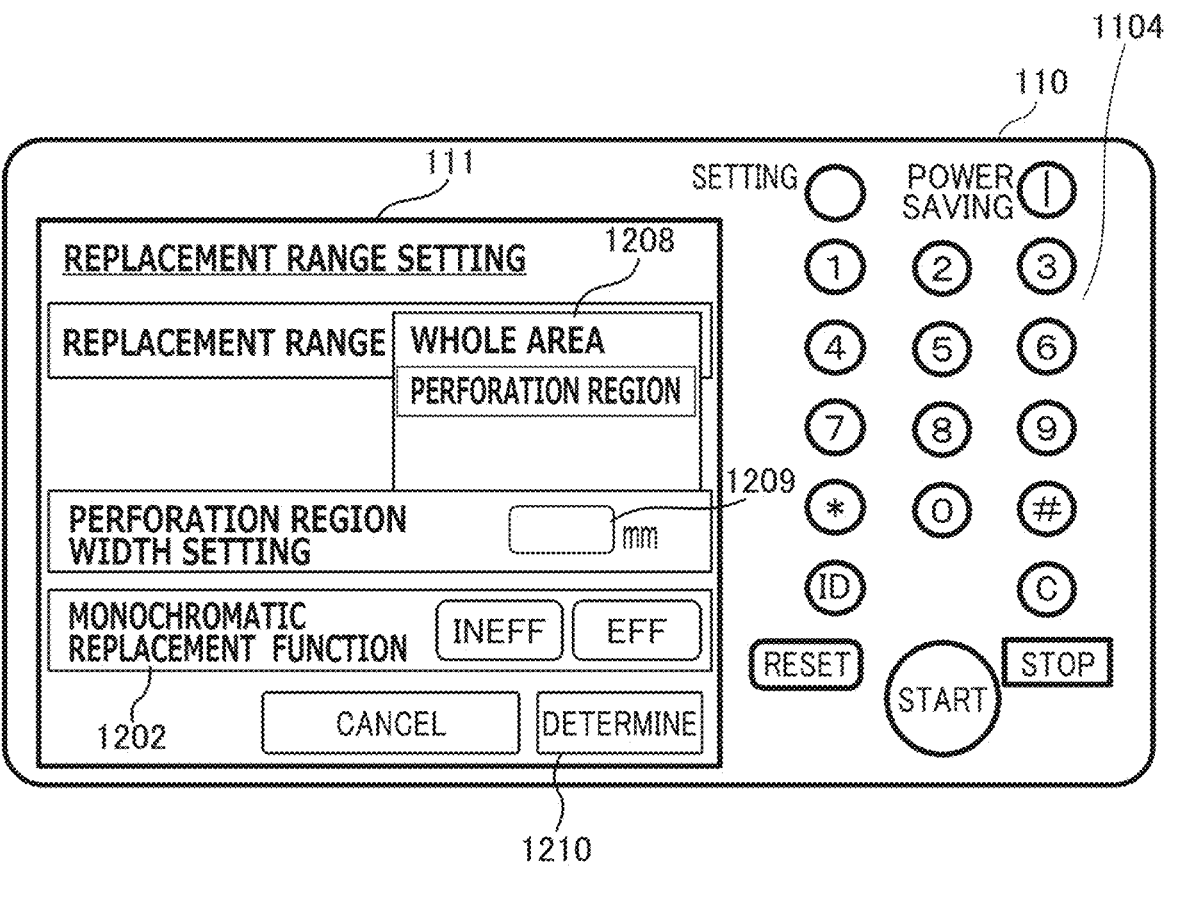
FIG. 12 is a schematic view showing a replacement range setting screen.

As shown in FIG. 12, on the "replacement range setting screen", a dialog box 1208 from which a range in which monochromatic replacement is performed is selectable is displayed. In this embodiment, a "WHOLE AREA" in which the whole area of the perforated sheet S is a replacement range and a "PERFORATION REGION" in which the perforated region of the perforated sheet S is the replacement range are displayed. The user is capable of setting the replacement range of the monochromatic replacement function by designating either one of items displayed on the dialog box 1208.

On the "replacement range setting screen", a region width setting box 1209 is displayed in the case where the perforated region of the perforated sheet S is the replacement range. The user is capable of setting a width (mm) of the perforated region in the region width setting box 1209 by operating numerical keys of the hardware key group 1104. For example, the width of the perforated region (perforation region width) is set to "10 mm". Incidentally, as described above, the toner constituting the perforated region is transferred onto an unintended portion due to a shape change of the sheet by being subjected to perforation processing, so that the shape and arrangement of dots are disordered. For that reason, a width of a region to which the monochromatic replacement function is applied, i.e., a width of the perforated region, may desirably be set to a value larger than a value of a width of a region in which the shape and arrangement of dots are disordered.

Further, on the "replacement range setting screen", the above-described selection button display portion 1202 is displayed. The user is capable of selecting that a half-tone processing changing function is made effective or non-effective, by operating either one of an "EFF" button or a "NON-EFF" button of the selection button display portion 1202. Then, the user presses down the "DETERMINE" button 1210, so that a replacement range of a half-tone processing, the perforation region width, execution or non-execution of the half-tone changing function are stored in the RAM 104 (see FIG. 2).

Figure 13:
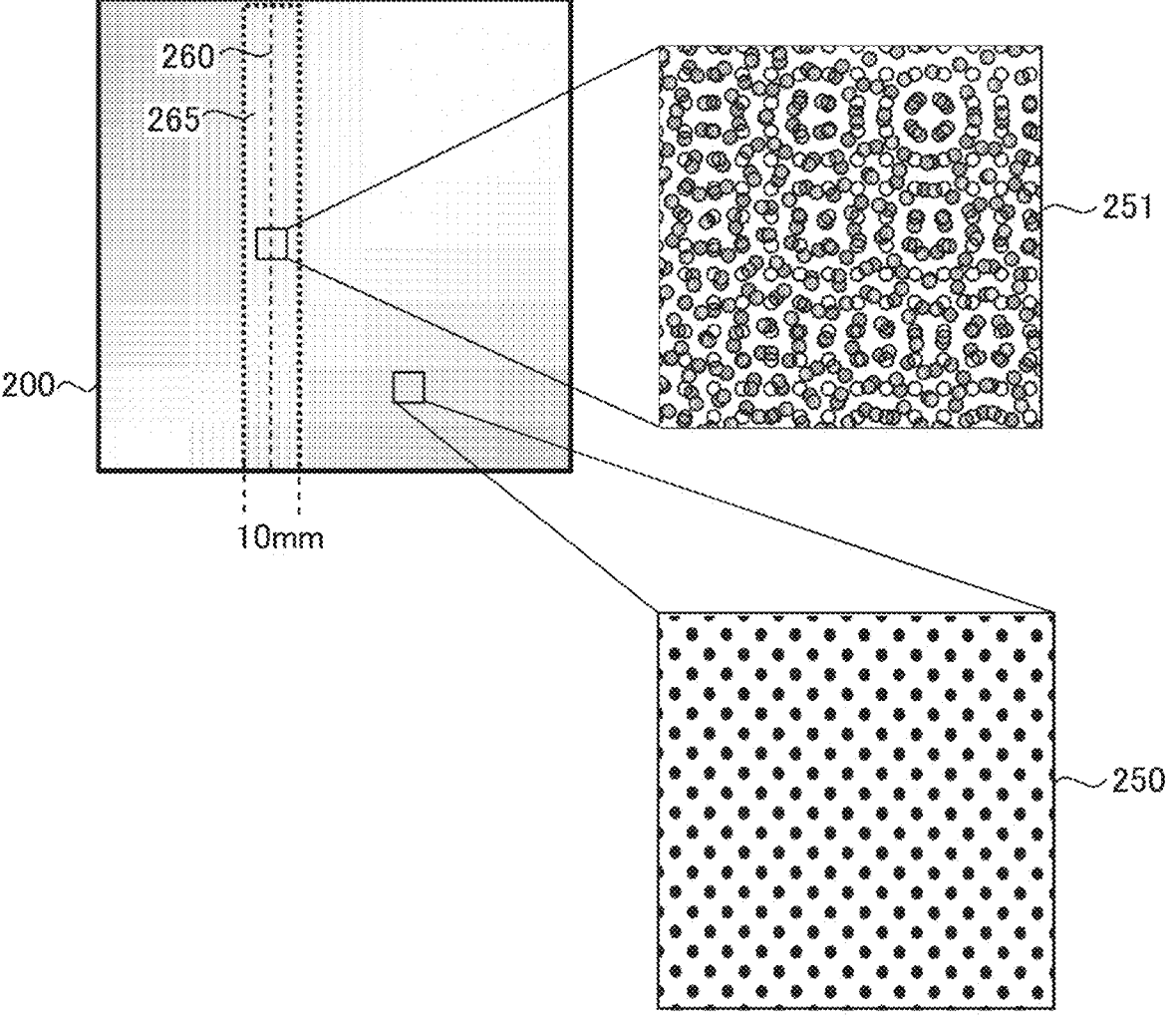
FIG. 13 is a schematic view showing an image in the case where monochromatic replacement is performed in a perforated region and is not performed in a region other than the perforated region.

In the case where monochromatic replacement is performed in the perforated region and is not performed in the region other than the perforated region, in FIG. 13, an image formed on the basis of output image data outputted by performing the AM screen processing in each of the perforated region and the region other than the perforated region is shown. A width of a perforated region 265 set on the basis of perforations 260 is "10 mm", for example.

As shown in FIG. 13, in the region other than the perforated region 265 which is not subjected to the monochromatic replacement, the image is formed by linearly arranging dots of the K toner (see minute region 250). In the region other than the perforated region 265, unintended electric discharge does not generate, so that the toner is not transferred onto an unintended portion. That is, the shape and the arrangement of dots forming the image are not disordered, so that an image defect such that the color tint of the toner image changes does not occur.

On the other hand, in the perforated region 265 subjected to the monochromatic replacement, the image is formed by arranging dots of the CMY toner at different screen angles. In the perforated region 265, the unintended local electric discharge generates as described above. However, in the image forming apparatus 100, the image of the monochromatic K toner formed in the perforated region 265 is changed to the image of the pseudo color with the CMY toner, so that even the shape and the arrangement of the dots are disordered with the unintended local electric discharge, and it becomes difficult to recognize whether or not the disordering occurred.

Thus, in the case where the kind of the sheet S is the perforated sheet S, in the perforated region, the user is capable of forming the image by changing the image of the monochromatic K color to the image of the pseudo color with the CMY toner. By this, in the case where the image is formed on the perforated sheet S by being subjected to the AM screen processing, a degree of appearance of the local disordering of the shape and the arrangement of the dots is reduced, so that the image defect due to burrs of the sheet S does not occur.

Incidentally, in the above-described second embodiment, a constitution in which the controller 101 subjects the inputted image data on the perforated region to the monochromatic replacement and does not subject the inputted image data on the region other than the perforated region to the monochromatic replacement is employed, but the present invention is not limited thereto. For example, in the case where the controller 101 performs the monochromatic replacement, an object thereof is not limited to only the inputted image data on the perforated region, but the controller 101 may also perform the monochromatic replacement for the inputted image data on a single image formed in a range including the perforated region.

Other Specific Embodiments

Incidentally, in the above-described first and second embodiments, an example in which the monochromatic K toner is replaced with the CMY toner in the case where the kind of the sheet S is the perforated sheet S was described, but the present invention is not limited thereto. For example, the monochromatic K toner may also be replaced with the CMYK toner. In the case where the monochromatic K toner is replaced with the CMYK toner, the controller 101 replaces the color information of the image formed in the perforated region for the inputted image data with the combination of the CMYK toner capable of reproducing the black from the K toner (black) in the pseudo manner. The controller 101 performs the above-described replacement of the color information by making reference to the monochromatic replacement table stored in the ROM 103.

In this case, in the monochromatic replacement table, for example, with respect to the monochromatic K toner, a print amount of the C toner, a print amount of the M toner, and a print amount of the Y toner are defined as substantially the same value, and a print amount of the K toner is defined as a value larger than the print amount of each of the CMY toner. For example, in the case where K toner with a maximum density (gradation value: 255) is replaced with the CMYK toner, gradation values are designated so as to be "150" for the C toner, "150" for the M toner, "150" for the Y toner, and "200" for the K toner, and thus are defined so that the pseudo color can be reproduced. After the color information is replaced, the controller 101 performs the image forming processing with use of the CMYK toner on the basis of the color information after the replacement in the perforated region, and carries out image formation with use of the CMYK toner on the basis of the color information set for the inputted image data in the region other than the perforated region. By this, the toner image of the monochromatic K toner is replaced with a replacement toner image formed with the four colors of the CMYK toner.

A table 2 shows a result of evaluation of occurrence or non-occurrence of the image defect in the perforated region due to the burrs of the sheet S in the case where the CMYK toner are used and in the case where the monochromatic K toner is used.

17

TABLE 2

| TONER USED | CMYK | ONLY K |
|---|---|---|
| IMAGE DEFECT | NOT OCCURRED | OCCURRED |

The occurrence or non-occurrence of the image defect in the table 2 was evaluated in the following manner. First, a toner image was formed on the perforated sheet S on the basis of predetermined color information. The predetermined color information in this case is color information determined so that a print ratio becomes 30% in the case where the monochromatic K toner ("ONLY K") in the "TONER USED" row in the table 2 is used, and becomes a print ratio determined on the basis of a well-known technique, in which black of the image formed with the monochromatic K toner can be reproduced in the pseudo manner, in the case where the CMYK toner ("CMYK") in the "TONER USED" row in the table 2 is used. Incidentally, the print ratio mentioned in this case is a ratio (area ratio) of an area in which the toner is present in a minute region 201 of an image forming region 200 as shown in FIG. 7 on the basis of the print ratio of "100%" taken when the toner is present in a whole area of the minute region 201 of the image forming region 200.

In the image forming apparatus 100, the color information in the case where the monochromatic K toner is used corresponds to color information before the replacement, and the color information in the case where the CMYK toner are used corresponds to color information after the replacement. The user discriminated whether or not the image defect occurred by checking the toner image formed on the basis of each of the above-described pieces of the color information, by eye observation.

Figure 14:
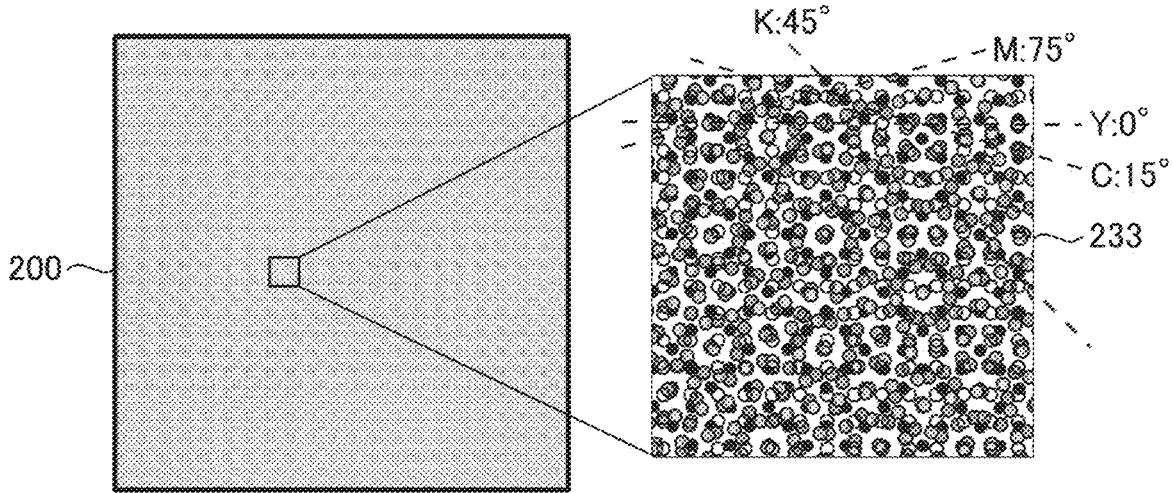
FIG. 14 is a schematic view showing an image formed with CMYK toner.

As shown in the table 2, in the case where the monochromatic K toner was used, the image defect due to the burrs of the sheet S occurred. On the other hand, in the case where the CMYK toner were used, the image defect due to the burrs of the sheet S did not occur. In FIG. 14, an image formed in the perforated region with the CMYK toner after the replacement is shown.

As shown in FIG. 14, in the case where the image is formed with the CMYK toner, arrangement directions (screen angles) of the dots of the respective colors are different from each other, and therefore, a state which is called a Rosetta pattern is formed (see minute region 233). The Rosetta pattern is a pattern of a disordered dot arrangement consisting of complicated interference. Even when the unintended local electric discharge generates in the above-described perforated region and the shape and the arrangement of the dots are disordered, the color tint in the perforated region is not changed compared with the color tint in another region.

Incidentally, in the above-described first and second embodiments, the case where the controller 101 includes the image processing portion 105 was described as an example, but the present invention is not limited thereto. For example, as shown in FIG. 1, a constitution in which an information processing apparatus 101A is connected to the image forming apparatus 100 so as to be capable of transmitting and receiving data therebetween, and in which the information processing apparatus 101A includes an image processing portion 105A for subjecting the inputted image data to color conversion processing may be employed. In the case of this constitution, an external device 1000A is connected to the information processing apparatus 101A so as to be capable of transmitting and receiving data therebetween, so that the information processing apparatus 101A receives image data (inputted image data) sent from the external device 1000A. The information processing apparatus 101A causes the image processing portion 105A to subject the inputted image data to the color conversion processing and generates image data obtained by replacing the monochromatic K toner with the CMY or the CMYK, and then sends the image data to the image forming apparatus 100. The controller 101 of the image forming apparatus 100 subjects the image data, received from the information processing apparatus 101A, to half-tone processing and then causes the image forming portions Pa to Pd to form an image on the basis of the outputted image data. At that time, the controller 101 sends, to the information processing apparatus whenever necessary, for example, the kind of the sheet S, execution or non-execution of the monochromatic replacement function, the range in which the monochromatic replacement function is performed, the width of the perforated region, the position of perforations, and the like, which are inputted by operation of the operating portion 110 by the user. On the basis of these pieces of information, the information processing apparatus 101A is capable of subjecting the perforated sheet S to the monochromatic replacement as described above.

Incidentally, in the above-described first and second embodiments, the case where the monochromatic K toner is replaced with the CMY toner or the CMYK toner when the kind of the sheet S is the perforated sheet S was described as an example, but the present invention is not limited thereto. Also, in the case where the color is a monochromatic toner color other than the black, when the toner of the "monochromatic toner color other than the black" is replaced with the CMY toner or the CMYK toner, it is possible to suppress the occurrence of the above-described image defect due to the burrs of the sheet S. For example, monochromatic Y toner is replaced with the CM toner, monochromatic M toner is replaced with YC toner, and monochromatic C toner is replaced with YK toner. That is, each of the monochromatic toner images is replaced with a replacement toner image formed with toner of two or more colors of colors other than the associated color.

Incidentally, in the above-described first and second embodiments, the image forming apparatus having the constitution in which the toner images of the respective colors are primary-transferred from the photosensitive drums 3a to 3d for the respective colors onto the intermediary transfer belt 80, and then composite toner images of the respective colors are secondary-transferred collectively on the sheet S was described, but the present invention is not limited thereto. For example, the image forming apparatus may also be an image forming apparatus of a direct transfer type in which toner images on photosensitive drums are directly transferred onto a sheet, conveyed to a conveyance belt forming a nip between itself and each of the photosensitive drums, under application of a transfer roller disposed opposed to the associated one of the photosensitive drums while nipping the conveyance belt between the photosensitive drum and the transfer roller.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-098587 filed on Jun. 15, 2023, which is hereby incorporated by reference herein in its entirety.

What is claimed is:

1. An image forming apparatus capable of forming an image on a perforated sheet, comprising:

an image forming portion configured to form a toner image with toner of a plurality of colors;

an image processing portion configured to perform image processing on image data acquired; and a controller configured to control the image processing portion to form the toner image on the basis of the image data processed by the image processing portion, wherein in a case that a sheet on which the toner image is to be formed is the perforated sheet, the image processing portion performs the image processing so that black image data is formed as image data of process black with the toner of the plurality of colors by the image forming portion, wherein the controller is capable of acquiring a position of the perforated sheet where perforations are formed, wherein the image processing portion performs the image processing so that the black image data corresponding to a predetermined region of the perforated sheet where the perforations are formed is formed as the image data of the process black by the image forming portion, and wherein the image processing portion specifies the image data positioned in the predetermined region on the basis of the position where the perforations are formed.

2. An image forming apparatus according to claim 1, wherein the image processing portion performs AM screen processing on the image data.

3. An image forming apparatus according to claim 1, further comprising a selecting portion capable of selecting a kind of the image processing, wherein the image processing portion performs the image processing selected by the selecting portion.

4. An image forming apparatus according to claim 3, wherein the selecting portion includes a display portion, and wherein in the case that the sheet on which the toner image is to be formed is the perforated sheet, the display portion displays a screen for selecting the image processing.

5. An image forming apparatus according to claim 1, wherein the image processing portion replaces the black image data with image data of three colors of yellow, magenta, and cyan.

6. An image forming apparatus according to claim 1, wherein the image processing portion replaces the black image data with image data of four colors of black, yellow, magenta, and cyan.

7. An image forming apparatus according to claim 1, further comprising an original reading portion which includes an irradiating portion configured to irradiate the sheet with light and a light receiving portion configured to receive reflected light, of the irradiated light, from the sheet and which is capable of reading an image on the sheet, wherein the controller acquires the position of the perforations on the basis of a result of reading the perforated sheet by the original reading portion.

8. An image forming apparatus according to claim 1, further comprising an input portion to which the position of the perforations and a range of the predetermined region are capable of being inputted.

* * * * *